April 14, 1931. E. F. SCHERMERHORN 1,800,475
INSULATED JOINT CONSTRUCTION FOR HEAD FREE RAILS
Filed June 28, 1930 3 Sheets-Sheet 1
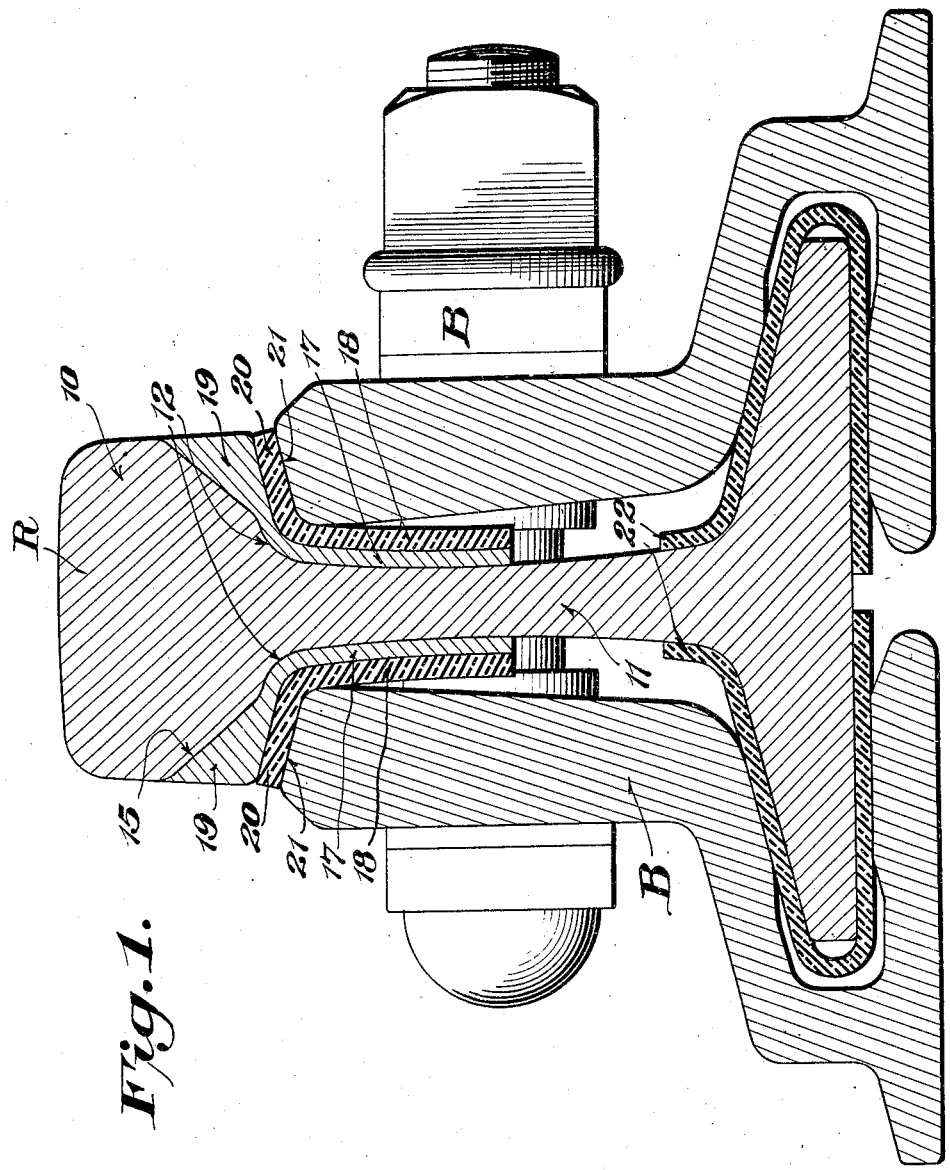
Inventor
E. F. Schermerhorn,
By
Attorney

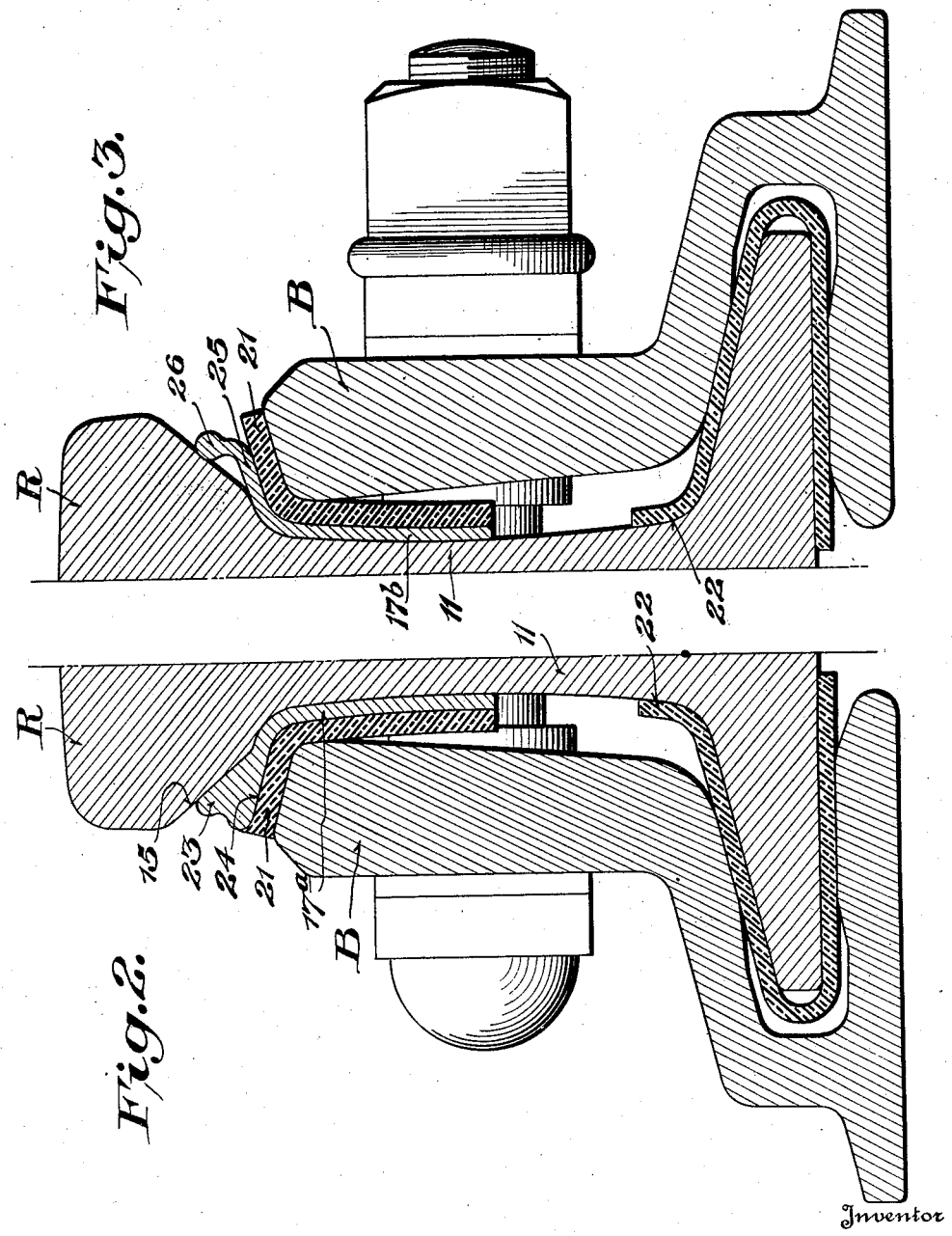

April 14, 1931.  E. F. SCHERMERHORN  1,800,475
INSULATED JOINT CONSTRUCTION FOR HEAD FREE RAILS
Filed June 28, 1930   3 Sheets-Sheet 3
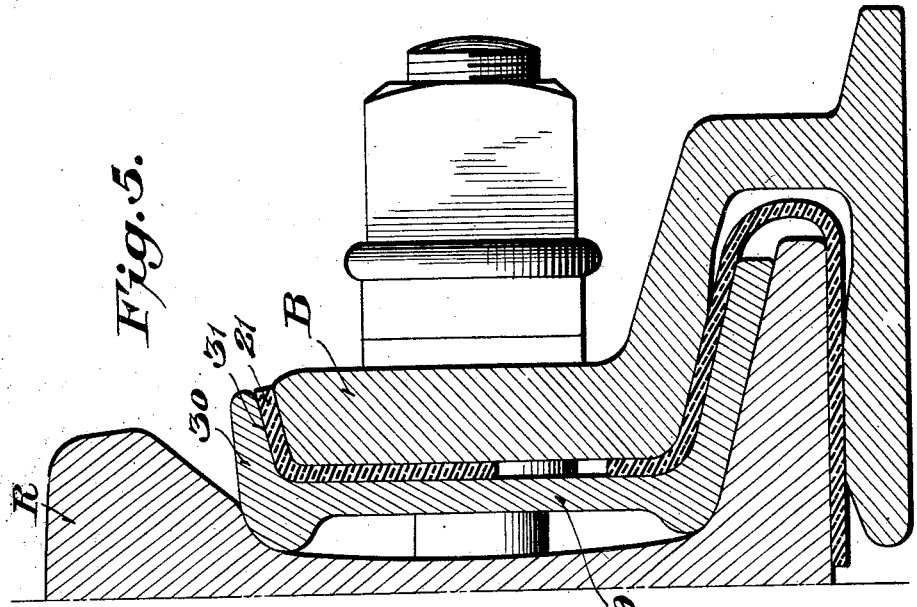
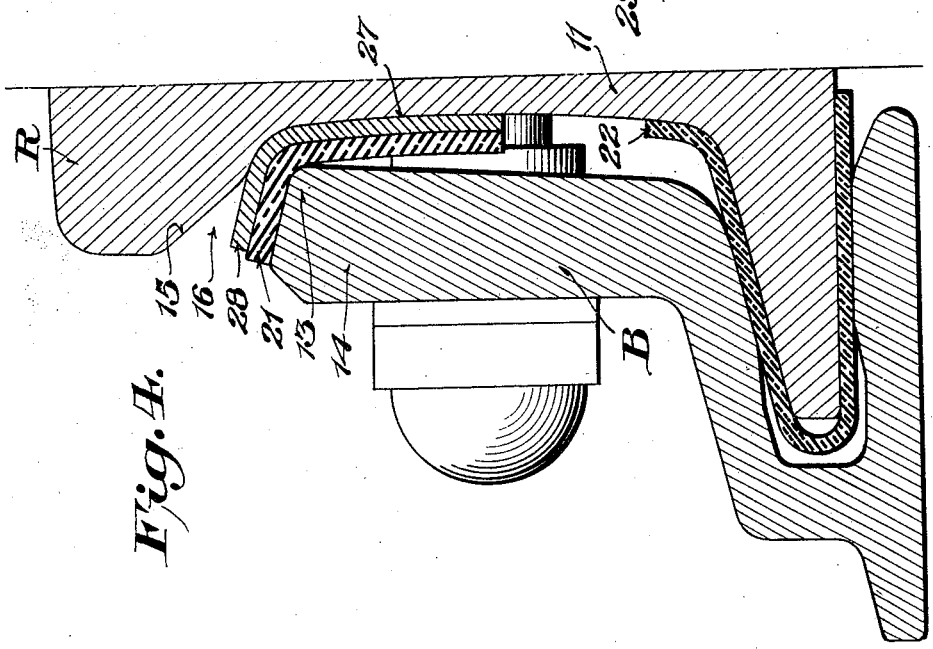
Inventor
E. F. Schermerhorn,
By
Attorney Patented Apr. 14, 1931

1,800,475

UNITED STATES PATENT OFFICE

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK

INSULATED-JOINT CONSTRUCTION FOR HEAD-FREE RAILS

Application filed June 28, 1930. Serial No. 464,653.

This invention relates to an insulated joint construction specially adapted for use in connection with the so-called headfree type of rail and has for its primary object a novel means of obtaining a substantial enwidened bearing area for the insulating material to increase its effectiveness and life.

In the headfree type of rail the loading engagement of the joint bar is usually taken in the head fillet of the rail and in adapting this structure for insulated rail joints its effectiveness may be improved and the life of the insulation materially conserved by providing a supplementary widened bearing surface over and through which the load is distributed to the insulation so that a thorough and satisfactory insulation of the joint may be provided for without subjecting the insulating material to undue or excessive wear, which ordinarily is responsible for the quick cutting out of insulating material, particularly that part of the material which is located under the rail heads within the medial portion of the joint.

Other objects will be apparent to those familiar with the insulated rail joint art as the nature of the invention is better understood and the same consists in the novel features, supplementary to the headfree rail, herein described, illustrated and claimed, and, while susceptible of numerous structural changes and modifications, a few of the practical embodiments, illustrative of the invention are shown in the accompanying drawings, in which:—

Figure 1 is a complete cross sectional view of an insulated joint constructed in accordance with the present invention.

Figures 2 and 3 are sectional half views of an insulated rail joint showing a modification of the type of supplementary bearing unit employed in the construction of Fig. 1.

Figure 4 is a half-sectional view of an insulated rail joint showing a simplified form of the invention embodying the supplementary bearing unit for the insulation material.

Figure 5 is a sectional half view of another form of construction embodying the feature of the supplementary bearing unit to provide a widened bearing surface for the head piece of insulation.

Like references designate corresponding parts throughout the several figures of the drawings.

In all figures of the drawings the reference letter R designates the rail and the reference letter B designates the splice bar associated with the rail and the other parts which constitute the complete rail joint structure for a headfree type of rail. It is now well known that this type of rail by comparison with the standard T-rail, omits the bottom corner structure of the head of the T-rail leaving at these locations in the headfree rail what may be termed a vacated space or area which may be utilized in some forms of the present invention to accommodate and seat the supplementary bearing unit which is fitted to the rail to provide the additional supplementary widened bearing surface for the insulating material. That is, in the headfree type of rail the head 10 thereof has the approximate conformation of an inverted truncated pyramid which at its junction with the web 11 is merged into the latter by a fillet 12 usually forming a fishing bearing for the inner projaction 13 of the head 14 of the joint bar. In other words beginning at a point spaced downwardly from the top of the rail the side of the rail head is inclined inwardly as indicted at 15 which obviously results in a vacated area or space 16 being disposed inwardly of the plane of the outer side of the rail head and the present invention may utilize both the vacated area or space 16 and the inclined bottom corners 15 of the rail head, said inclined bottom corners acting, in the present invention, as seats against which may be fitted or pressed the supplementary bearing unit for the insulating material.

From the foregoing it is to be understood that the present invention is intended to prevent the loading strains at the head fillet 12 of the rail being focused on the insulating material. To avoid that and to distribute the loading strains over a widened bearing area or surface the present invention contemplates the use of what may be termed a supplementary bearing unit. This supplementary bearing unit in the example shown in Fig. 1 of the drawings may consist of a steel shoe designated generally by the reference number 17 having a depending flange portion 18 fitting the web of the rail and the head fillet 12 thereof and provided at the top with a thickened substantially triangular head member 19 approximately fitting the vacated area 16 of the rail head and seated against the inclined faces 15 of the rail head. The said head member of the shoe 17 is formed at its underside with an inclined widened bearing surface 20 against which bears the head piece of insulating material 21 held in operative relation to the joint structure by the joint bar B and the head 13—14 thereof. The base part of this form of the invention may be insulated in any conventional manner as for instance by the base piece 22 of insulation fitting the rail flange and the base part of the joint bar which for illustrative purposes is shown as being of the continuous type of rail joint bar, though it will be understood that the present invention is not limited to any particular type of joint bar, except that such bar must have its head portion take a loading engagement at the head fillet of the rail and beneath the head part of the supplementary bearing unit 17.

By way of illustrating the wide range of modification to which the invention is susceptible there is shown in Fig. 2 of the drawings a modified form of supplementary bearing unit 17ª with merely a head enlargement 23 which has a pressing engagement against the inclined side 15 of the rail head and is formed at its underside as at 24 with the widened bearing surface for the head piece of insulation, in the same manner and for the same purpose as shown in Fig. 1 of the drawings.

Also, in Fig. 3 of the drawings a structural modification of what is shown in Fig. 2 is illustrated. That is to say, the supplementary metal bearing unit 17ᵇ is formed at the top with an outward flange 25 which provides the widened bearing surface for the insulating material and at its terminal is formed with a guard lip 26 turned upward and preferably rounded for pressing engagement against the said inclined side 15 of the rail head.

Substantially the same desirable feature of providing a supplementary widened bearing surface for the insulating material is shown in the modification of Fig. 4 of the drawings, wherein the supplementary bearing unit designated by the reference number 27 is in the form of a metal shim or flange having a head member 28 extending outward from the head fillet of the rail, and while not pressed against the inclined seat 15 nevertheless provides the widened extended bearing for the head piece of insulating material.

As further illustrative of the invention reference is made to Fig. 5 of the drawings showing a supplementary bearing unit 29 formed of a heavy metal shim fitting the fishing of the rail and provided with a head member 30 extending outward from and beyond the head fillet of the rail and formed at its underside with a widened supplementary bearing surface 31 for the head piece 21 of insulation held in place by the joint bar B.

Other modifications will be apparent to those familiar with this art and it will be understood that various changes in the form, proportion and minor details of construction may be resorted to, without departing from the spirit of the invention and scope of the appended claims.

I claim:—

1. An insulated rail joint including in combination the headfree type rail, a supplementary bearing unit fitting the head fillet of the rail provided with an outward extension having a widened bearing surface, the insulating material fitting said bearing surface and the joint bar.

2. An insulated rail joint including in combination with the headfree type of rail and a joint bar, a supplementary bearing unit fitting the rail head fillet and provided with a head member projecting laterally beyond said fillet and formed at its underside with a widened bearing surface, and insulation interposed between the joint bar and said bearing unit.

3. An insulated rail joint including the headfree type rail, the joint bar, and a metal supplementary bearing unit fitting the head fillet of the rail and engaging the sloping underside of the rail head; said unit having a head member provided at its underside with a widened bearing surface and insulation interposed between the joint bar and the bearing unit.

4. An insulated rail joint including the rail having the bottom corners of its head truncated forming sloping side portions, the joint bar, a metal supplementary bearing unit fitting the head fillet of the rail and a sloping side of its head, said unit being provided at the underside of its head portion with a widened supplementary bearing surface, and insulation interposed between said unit and the joint bar.

5. An insulated rail joint including in combination, the headfree type rail having sloping bottom corners forming seats, the joint bar, and a metal supplementary bearing unit consisting of a shoe fitting the rail web and the head fillet thereof and provided at the top with a head member approximately filling the area vacated by the truncated corner of the rail head and formed at its underside with a widened bearing surface for the insulation, and insulation interposed between the joint bar and the said bearing unit.

In testimony whereof I hereunto affix my signature.

EDWARDS F. SCHERMERHORN.